United States Patent [19]

Msarsa

[11] Patent Number: 4,527,991
[45] Date of Patent: Jul. 9, 1985

[54] SMALL ANIMAL PROTECTIVE GARMENT

[76] Inventor: Johnnie Msarsa, 404 Smokey View Rd., Knoxville, Tenn. 37920

[21] Appl. No.: 516,207

[22] Filed: Jul. 21, 1983

[51] Int. Cl.$^3$ ............................................. A01K 23/00
[52] U.S. Cl. ..................................... 604/399; 119/95
[58] Field of Search ......................... 119/95; 604/399

[56] References Cited

U.S. PATENT DOCUMENTS

| | | | |
|---|---|---|---|
| 3,792,687 | 2/1974 | Ehrman | 119/95 |
| 3,817,217 | 6/1974 | Matuka et al. | 119/95 |
| 3,875,903 | 4/1975 | Sarvary | 119/95 |
| 4,095,562 | 6/1978 | Graham | 119/95 |
| 4,103,645 | 8/1978 | Tyler | 119/95 |
| 4,290,386 | 9/1981 | Eiriksson | 119/95 |

Primary Examiner—William H. Grieb
Attorney, Agent, or Firm—Pitts and Brittian

[57] ABSTRACT

A device and garment for use by small animals of both sexes to absorb and collect body waste fluids. The device includes an outer garment (14) which has a waist aperture (16) for fitting around the body of a small animal (12), a pair of leg apertures (18 and 20) for fitting around the legs of the animal, and a tail aperture (22). The waist aperture (16) and the leg apertures (18 and 20) include a resilient material or band (28 and 30) for assuring that the apertures fit snugly around the animal's body and legs respectively. The tail aperture (22) is particularly located and of such a size that the anal opening of the animal is not covered. The outer garment (14) further includes a first portion (32) of an attaching means such as a snap or "Velcro" fastener at a first location which is adjacent the tail aperture (22) and in between the leg apertures (18 and 20). Also included is another first portion (34) of an attaching means located adjacent the waist aperture (16). A disposable pad (36) is fit within the outer garment (14) as an absorbent layer (38) and a liquid impervious layer (40). A second portion (54) of an attaching means which cooperates with either of the first portions (32 or 34) on the garment (14) is used to hold the disposable pad in appropriate locations within the outer garment (14).

11 Claims, 9 Drawing Figures

SMALL ANIMAL PROTECTIVE GARMENT

DESCRIPTION

1. Technical Field

This invention relates to a device or garment worn by small animals, and more particularly to a garment for absorbing and collecting animal waste fluids to prevent damage to rugs and furniture when the animal is kept indoors. More specifically, the garment of this invention includes a disposable pad which specifically collects the animal waste liquids and which works in conjunction with an outer garment.

2. Background Art

Various types of devices and garments for use by small animals have been designed over the years to eliminate some of the more distasteful tasks associated with keeping and cleaning up after a small animal such as a dog or cat. A search of the prior art to determine what has been available in the past, discloses several patents covering such devices and garments. However, a study of the previous patents discloses that most of the devices were either clumsy or comical when used by the animal, and in some instances created more problems than were solved. Furthermore, it will be appreciated by a study of the previous patents that the prior art devices were normally more concerned with the collection of waste fecal matter eliminated by the animal than waste liquids. However, as will be appreciated by most pet owners, although cleaning up the waste fecal matter from an animal is certainly not a pleasant task, damage to rugs and furniture typically occurs from the animal's urine or in the case of a female animal, estrous fluids.

Consequently, it is a particular object of the present invention to provide a protective garment which is suitable for absorbing and collecting such animal waste fluids.

As examples of the prior art devices, U.S. Pat. No. 3,792,687 issued to Alexander Ehrman on Feb. 19, 1974 discloses a device having a harness which is secured to the animal and which harness supports a normally flat, opaque polyethylene bag for receiving and collecting the animal's fecal matter. This device in no way will collect or absorb the animal's waste liquids. Two other patents, U.S. Pat. No. 3,817,217 issued to J. H. Matuka, et al. on June 18, 1974 and U.S. Pat. No. 3,875,903 issued to F. O. Sarvary on Apr. 8, 1975; each disclose devices for collecting the animal's fecal matter, but neither of these devices are designed to absorb and collect the animal's waste liquid fluids.

On the other hand, U.S. Pat. No. 4,095,562 issued to T. Graham on June 20, 1978 and U.S. Pat. No. 4,290,386 issued to Richard Eiriksson on Sept. 22, 1981 both disclose devices for collecting and trapping both the fecal matter of the animal and the waste fluids. Thus, although these two devices include at least one function which is the same as the device of the present invention, the devices are considerably more complex because of their dual purpose and also are believed to be rather binding on the animal since they operate the same for both the female animal and the male animal.

Accordingly, it is another object of the present invention to provide a simple device for collecting and absorbing waste liquids from a small animal which may be used effectively for both male and female animals.

It is still another object of the present invention to disclose a device which is simply placed on the animal and which is not particularly uncomfortable to the animal.

It is yet another object of the present invention to provide a device which is particularly useful for elderly small animals which may be able to control their bowel movements but are incontinent.

DISCLOSURE OF THE INVENTION

Other objects and advantages will be obvious and will in part appear hereinafter, and will be accomplished by the present invention which provides a garment for small animals of both sexes to absorb and collect waste body fluids. The device comprises an outer flexible support garment which has a front side and a back side and which is suitable for fitting over the animal's hind quarters. The support garment also defines a waist aperture to fit around the body of the animal along with a pair of leg apertures for receiving the animal's legs, and a tail aperture for the animal's tail to pass through. The waist aperture and the leg apertures each include a resilient material surrounding the aperture such that these apertures fit snugly around the animal's body and rear legs respectively. The tail aperture, on the other hand, was purposely made large enough for the animal's tail to pass through and of such a size and location so that the anal opening of the animal is not covered. Included with the flexible support garment, there is a first portion of a cooperating two-piece attaching means, such as a snap fastener, which is secured to the support garment at a location at the front side and adjacent to the tail aperture. Another first portion which is similar to the previously discussed first portion of a cooperating two-piece attaching means is also secured to the support garment, but the second location is adjacent the waist aperture and on the front side yet opposite and at a first selected distance from the first portion of the attaching means discussed above.

Also included with the device is a disposable pad which has an absorbant face and a liquid impervious face. The pad is defined by a pair of side edges, an attaching edge, and a free edge which is opposite the attaching edge. The side edges are spaced a second selected distance apart and extend for a third distance between the attaching edge and the free edge. The third selected distance is less than the first selected distance but greater than the second selected distance. A second portion of the two-piece attaching means discussed heretofore which cooperates with such previously discussed first portions of the attaching means is secured at the attaching edge at a position midway between the two side edges and on the liquid impervious face. The disposable pad therefore may be placed in the outer garment in a first position such that the second portion of the cooperating two-piece attaching means attaches to the first portion at the first location of the first portion such that the free end extends towards the second location of the first portion so that when the garment is on the small animal, the disposable pad will be located to collect and absorb urine and estrous fluid discharged by a female animal. Alternately, the pad may be attached to the other position of the attaching means at another location such that the free end of the pad extends towards the first location of the first portion so that the disposable pad will be located to collect and absorb urine discharged by a male animal. It will also, of course, be appreciated that the attaching means may comprise either two-piece snap fasteners or a fabric hook-and-loop attaching means, commonly called "Velcro".

In a preferred embodiment, the disposable pad also includes a pair of longitudinal folds parallel to the long dimensions to provide more material and increase the absorbent capabilities. In addition, there may also be included binding proximate the free edge of the pad such that the longitudinally folded pad is maintained in a folded condition at the free end while at the same time the folds are free to expand at the attaching edge and thereby form a pocket to increase the waste collecting capabilities.

BRIEF DESCRIPTION OF THE DRAWINGS

The above-mentioned features of the present invention will be more clearly understood in consideration of the following description in connection with the accompanying drawings in which.

BEST MODE FOR CARRYING OUT THE INVENTION

Figure 1:
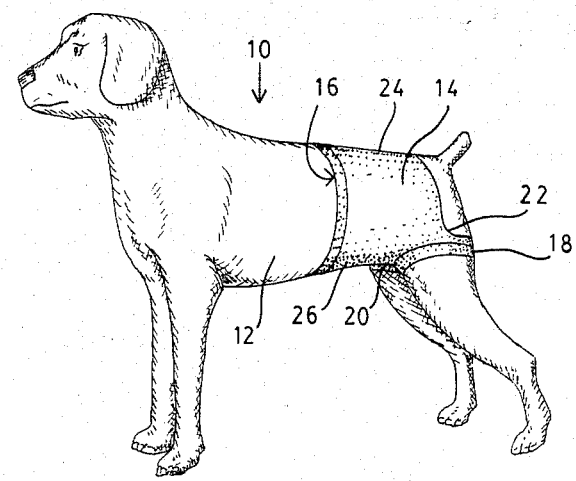
FIG. 1 illustrates a dog with the device of this invention in place.

Referring now to FIG. 1, there is shown generally at 10 a small animal such as dog 12 having the device 14 in place over the dog's hind quarters. As shown, the device defines an aperture 16 which fits around the animal's body and also defines two leg apertures 18 and 20 for fitting snugly around the animal's rear legs. Finally, there is a tail aperture 22 which allows the dog's tail to pass through and which aperture is in such a position that the outer garment does not cover the animal's anal opening under the tail. As seen, the outer garment 14 includes a back side 24 which covers the animal's back and a front side 26 which covers a portion of the animal's belly side.

Figure 2:
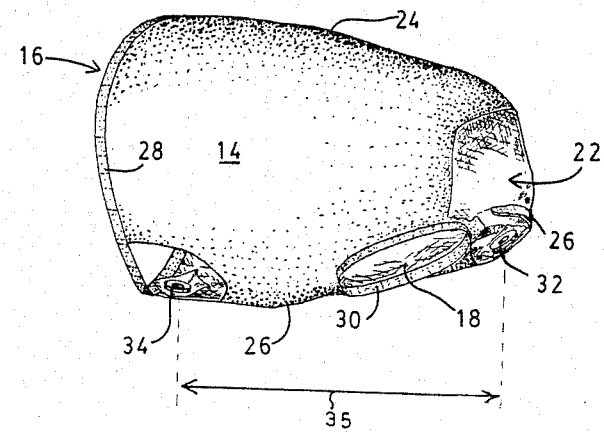
FIG. 2 is a plan view in partial cross section of the outer garment of this device.

Referring now to FIG. 2, there is shown an enlarged and more detailed partially break-away view of the outer garment discussed hereinabove. As shown, the garment includes a resilient band 28 surrounding the body aperture 16 and a resilient band 30 surrounding the left leg aperture 18. It will also be appreciated that a similar resilient band will surround the aperture 20 for the right rear leg of the garment even though this aperture cannot be seen in the view of FIG. 2. It will be appreciated, that the resilient material or band 28 and 30 surrounding the apertures may preferably be made of a simple elastic material sewed into the outer garment material such that the body apertures and the leg apertures fit snugly around the animal's body and legs respectively. However, it will also be clearly seen that the tail aperture 22 does not include a resilient band such that the aperture would fit snugly around the animal's tail. In fact, as discussed above, this aperture is purposely made overly large and sufficient to allow the animal's tail to pass therethrough without at the same time covering the animal's anal opening.

Also as shown, there is included a first portion 32 of a cooperating two-piece attaching means which portion is secured at a first location on the front side 26 of the outer garment adjacent to the tail aperture 22 and between the two leg apertures 18 and 20. In a similar manner, there is another similar first portion 34 of such an attaching means secured to the outer garment 14 at a second location. This second location being adjacent to the waist aperture and also at the front side 26 of the garment and in a line at a selected first distance 35 and opposite the attaching means first portion 32. Although the material that the garment 14 is made of is not critical to this invention, in a preferred embodiment, the material may simply be of a towel or terry cloth material. It will also be appreciated that for added protection certain types of water proof vinyls could also be used for the outer garment 14. However, in the event of water proof materials, it will be appreciated that breathing holes may be necessary to prevent discomfort and perhaps irritation to the animal's body.

Figure 3:
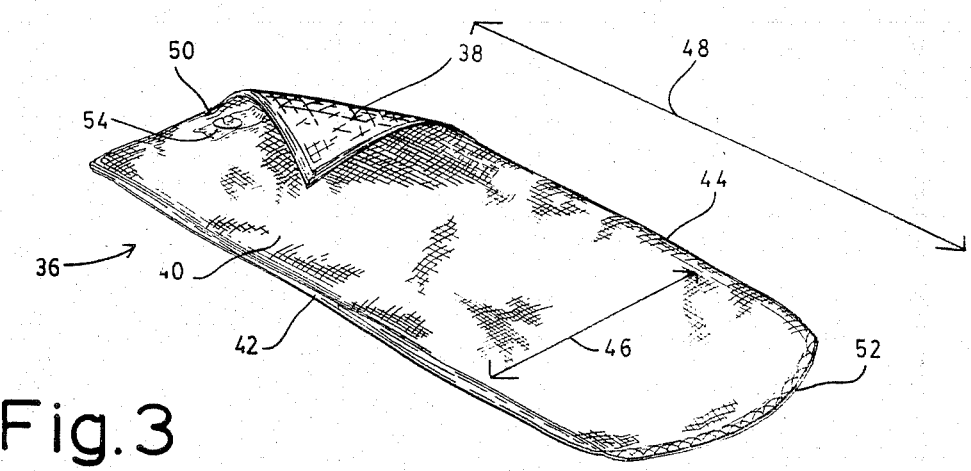
FIG. 3 is a perspective view of the disposable pad feature of this invention which works in conjunction with the outer garment of FIG. 2.

Referring now to the perspective views of FIG. 3, there is shown a disposable pad 36 which works in conjunction with the present invention. As shown, the pad includes an absorbent face 38, and a liquid impervious face 40. The absorbent face and the liquid impervious faces, it will be appreciated, are similar to the materials found and associated with disposable diapers presently commercially available. In addition, the pad is defined by two side edges 42 and 44 which are spaced from each other a second selected distance as is indicated by double headed arrow 46 and which sides extend another or third selected distance as indicated by double headed arrow 48. It will be appreciated, and become clear hereinafter, that the distance represented by double headed arrow 48 is greater than the distance represented by the double headed arrow 46 but is less than the first selected distance between the two first portions 32 and 34 of the attaching means attached to the outer garment 14. The pad also includes an attaching edge 50, and a free edge 52. As can be seen, a cooperating or second portion 54 of an attaching means, which is suitable for cooperating with the first portions 32 and 34 of the attaching means discussed hereinabove is permanently secured proximate attaching edge 50. As will be discussed hereinafter, with respect to other figures, the pad may be placed in the outer garment 14 in a first position such that the second portion 54 of the attaching means cooperates and works with first portion 32 of the attaching means secured to outer garment 14. When attached in such a manner, the free end 52 will extend towards the waist aperture 16 and the other cooperating second portion 34 of the attaching means. In this position, the pad is better situated to collect and absorb urine and estrous fluids discharged by a female animal.

Alternately, the pad 36 may be placed in a second position such that the second portion 54 of the attaching means located on the liquid impervious face 50 of disposable pad 36 may be attached to the first portion 34 of the attaching member located adjacent the waist aperture 16 of the support garment 14. In this position, the free end 52 will extend towards the rear of the garment and towards the first portion 32 of the cooperating attaching means. In this second position, the pad is better located to collect and absorb urine from a male animal.

Figure 4:
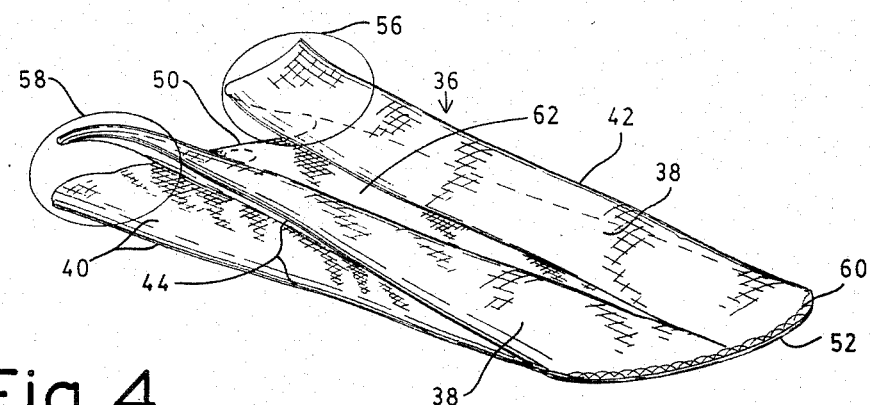
FIG. 4 is a perspective view of an alternate embodiment of a pad.
Figure 5:
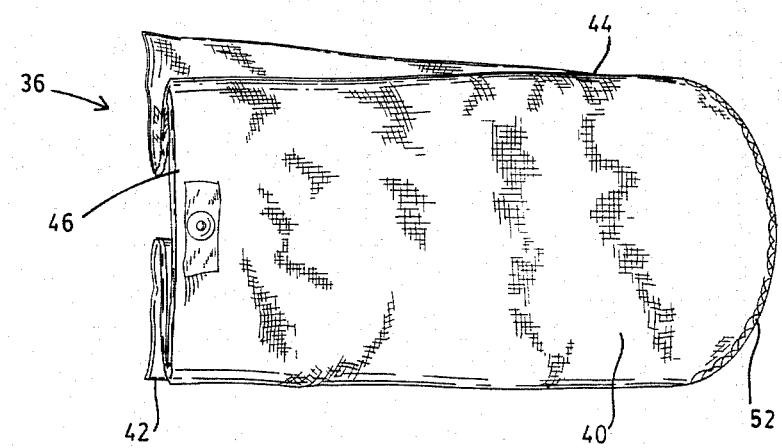
FIGS. 5, 6 and 7 are a back view, side view and front view of the disposable pad of FIG. 4 respectively.
Figure 6:
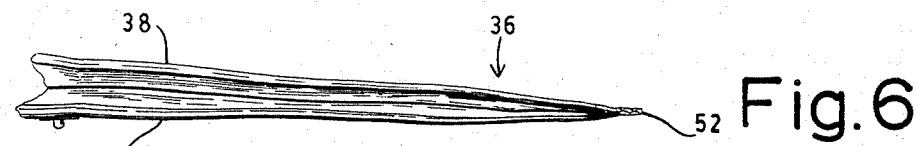
Figure 7:
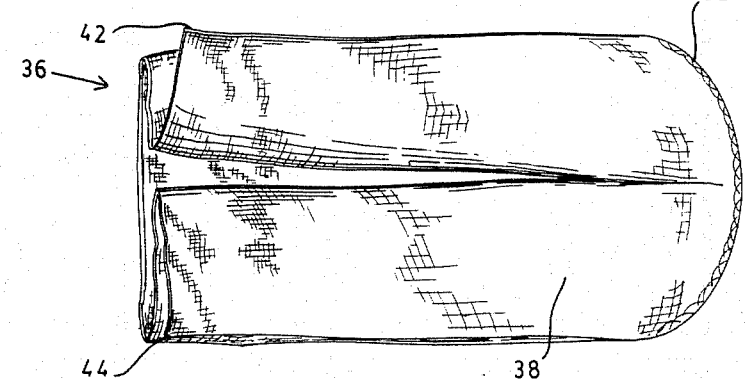

It will be appreciated that although the disposable pad of FIG. 3 heretofore discussed, will work with the present invention, there is shown a perspective view of FIG. 4 along with a back view, a side view and front view of FIGS. 5, 6 and 7 respectively of a disposable pad which has an increased ability to collect and absorb the liquid waste materials from the animal. It will further be appreciated that the disposable pads of FIGS. 4, 5, 6 and 7 will include the same reference number as that of the pad of FIG. 3 where possible, and where the reference numbers identify identical portions. Thus, as can be seen, the pad of FIG. 4 includes a pair of longitudinal double folds 56 and 58 to provide more material and increase the absorbent capabilities. Also as shown, in this particular embodiment, there is included a binding 60 at the free end 52 of the longitudinal double folds whereas the end of the longitudinal double folds located adjacent the attaching end remain loose. Thus, it will be appreciated that in use pocket 62 is formed within the pad on the absorbent face side 38 to further increase the liquid collecting and absorbing capabilities.

Figure 8:
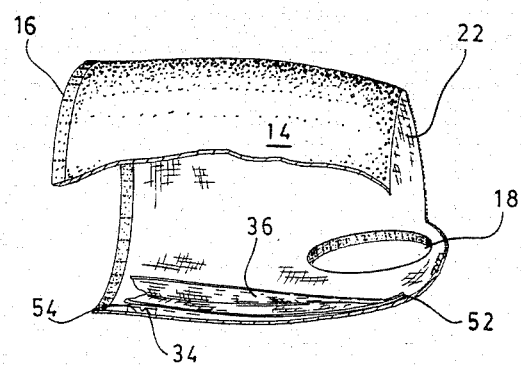
FIG. 8 is a cut-away view of the outer garment of FIG. 2 showing the protective pad of FIG. 4 in place for use with a male animal.

Referring now to FIG. 8, there is shown the garment 14 of FIG. 2 and the disposable pad 36 of FIG. 4 such that the second portion 54 of the attaching means is cooperating with the receiving or first portion 34 of the attaching means located adjacent waist aperture 16. As can be seen, the free end 52 extends toward the tail aperture 22 and between the leg apertures 18 and 20. It will be appreciated, that positioning the pad 36 in this position is particularly suitable for collecting the urine of a male animal.

Figure 9:
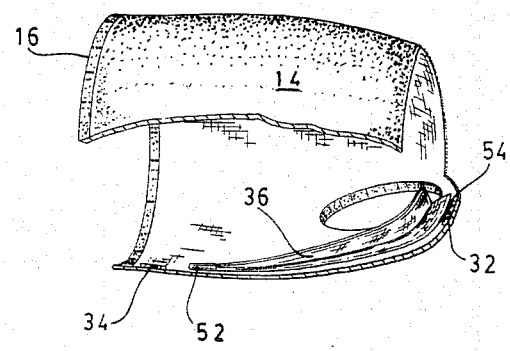
FIG. 9 is a cut-away view of the disposable pad of FIG. 4 in place with the outer garment of FIG. 2 for use by a female animal.

Alternately, referring to FIG. 9, there is shown the outer garment 14 of FIG. 2 with a disposable pad 36 of FIG. 4 in a second position. In the second position, the second portion 54 of attaching means is shown cooperating with the first portion of the attaching means 32 with the free end 52 of the pad 36 directed towards the waist aperture 16 and the other first portion 34 of the attaching means. It will be appreciated by those familiar with small animals such as dogs, this position of the absorbent pad will be particularly effective in collecting the urine and waste estrous fluid discharged by a female animal.

Thus, although there has been described a particular device suitable for collecting waste liquids from small animals, it is not intended that such specific references be considered as limitations upon the scope of this invention except insofar as these limitations are set forth in the following claims.

I claim:

1. A garment for small animals of both sexes to absorb and collect waste body fluids comprising:

an outer flexible support garment, having a front side and a back side suitable for fitting over such an animal's hind quarters, said support garment defining a waist aperture to fit around the body of said animal and a pair of leg apertures for passing the animal's rear legs therethrough, said waist aperture and said pair of leg apertures, each including a resilient material therearound such that said apertures fit snugly around the animal's body and rear legs respectively, said support garment further defining a tail aperture located at said back side between and proximate said pair of leg apertures to allow the tail of said animal to pass therethrough, and being of such size and location so that the anal opening of said animal is not covered;

a first first portion of a cooperating two-piece attaching means secured to said support garment at a first location, said first location being at said front side and adjacent to said tail aperture;

a second first portion of a cooperating two-piece attaching means secured to said support garment at a second location, said second location adjacent said waist aperture, and at said front side opposite and at a first selected distance from said first first portion; and a disposable pad having an absorbant face and a liquid impervious face, said pad defined by a pair of side edges, an attaching edge, and a free edge opposite said attaching edge, said pair of side edges being spaced from each other a second selected distance and extending a third selected distance between said attaching edge and said free edge, said third selected distance being less than said first selected distance and greater than said second selected distance, said attaching edge extending between said pair of side edges and having a second portion of said cooperating two-piece attaching means secured proximate thereto at a mid-point between said side edges and on said liquid impervious face, said free edge also extending between said side edges at substantially said third selected distances from said attaching edge, said disposable pad having a first selected position such that said second portion of said cooperating two-piece attaching means attaches to said first first portion at said first location such that said free end extends toward said second location so that when said garment is on said small animal, said disposable pad will be located to collect and absorb urine and estrous fluid discharge by a female animal, and a second selected position such that said second portion of said cooperating two-piece attaching means attaches to said second first portion at said second location such that said free end extends toward said first location so that said disposable pad will be located to collect and absorb urine discharged by a male animal.

2. The garment of claim 1 wherein said two-piece attaching means comprises a snap-button.

3. The garment of claim 1 wherein said two-piece attaching means comprises a fabric hook and loop attaching means wherein said first portion of said attaching means comprises the loops and said cooperating second portion comprises the hooks.

4. The garment of claim 1 wherein said disposable pad includes a pair of longitudinal double folds parallel to said second dimension to provide more material and increase the absorbant capabilities.

5. The garment of claim 2 wherein said disposable pad includes a pair of longitudinal double folds parallel to said second dimension to provide more material and increase the absorbant capabilities.

6. The garment of claim 3 wherein said disposable pad includes a pair of longitudinal double folds parallel to said second dimension to provide more material and increase the absorbant capabilities.

7. The garment of claim 4 wherein said free edge includes binding proximate thereto such that the longitudinally double folded pad is secured in a folded condition at said free edge while free to expand at said attaching edge to form a pocket therein to increase the liquid collecting capabilities.

8. The garment of claim 5 wherein said free edge includes binding proximate thereto such that the longitudinally double folded pad is secured in a folded condition at said free edge while free to expand at said attaching edge to form a pocket therein to increase the liquid collecting capabilities.

9. The garment of claim 6 wherein said free edge includes binding proximate thereto such that the longitudinally double folded pad is secured in a folded condition at said free edge while free to expand at said attaching edge to form a pocket therein to increase the liquid collecting capabilities.

10. The garment of claim 1 wherein said support garment is made of terry cloth.

11. The garment of claim 7 wherein said support garment is made of terry cloth.

* * * * *